US010360509B2

(12) United States Patent
Osogami

(10) Patent No.: US 10,360,509 B2
(45) Date of Patent: Jul. 23, 2019

(54) APPARATUS AND METHOD FOR GENERATING AN OPTIMAL SET OF CHOICES

(71) Applicant: INTERNATIONAL BUSINESS MACHINES CORPORATION, Armonk, NY (US)

(72) Inventor: Takayuki Osogami, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 729 days.

(21) Appl. No.: 14/886,148

(22) Filed: Oct. 19, 2015

(65) Prior Publication Data
US 2017/0109643 A1    Apr. 20, 2017

(51) Int. Cl.
*G06N 7/00* (2006.01)
*G06Q 10/04* (2012.01)
*G06Q 10/06* (2012.01)
*G06Q 30/02* (2012.01)

(52) U.S. Cl.
CPC ............ *G06N 7/005* (2013.01); *G06Q 10/04* (2013.01); *G06Q 10/067* (2013.01); *G06Q 30/02* (2013.01)

(58) Field of Classification Search
CPC combination set(s) only.
See application file for complete search history.

(56) References Cited

U.S. PATENT DOCUMENTS

| | | | |
|---|---|---|---|
| 6,934,748 B1 | 8/2005 | Louviere et al. | |
| 7,958,063 B2 * | 6/2011 | Long | G06K 9/00147 706/12 |
| 8,165,853 B2 | 4/2012 | Pinto et al. | |
| 8,442,823 B2 * | 5/2013 | Jeon | G10L 15/1822 704/246 |
| 8,498,954 B2 | 7/2013 | Malov et al. | |
| 8,769,556 B2 * | 7/2014 | Guo | G06K 9/00677 382/118 |
| 9,430,740 B2 * | 8/2016 | Onsjo | G06Q 40/00 |
| 9,547,818 B2 * | 1/2017 | Osogami | G06N 3/0472 |
| 9,747,616 B2 * | 8/2017 | Osogami | G06Q 30/0254 |
| 9,792,889 B1 * | 10/2017 | Obara | G10H 1/0025 |
| 9,800,678 B2 * | 10/2017 | Kawanaka | H04L 67/306 |
| 9,819,755 B2 * | 11/2017 | Kawanaka | H04L 67/306 |
| 9,858,592 B2 * | 1/2018 | Osogami | G06Q 30/0254 |
| 9,866,590 B2 * | 1/2018 | Kamijoh | G06Q 50/01 |
| 9,916,541 B2 * | 3/2018 | Katsuki | G06N 7/005 |
| 9,934,771 B1 * | 4/2018 | Obara | G10H 1/0025 |

(Continued)

OTHER PUBLICATIONS

Bayesian active learning for choice models with deep Gaussian processes Jie Yanga, Diego Klabjanb , May 2018, pp. 1-27.*

(Continued)

*Primary Examiner* — Michael B Holmes
(74) *Attorney, Agent, or Firm* — Cantor Colburn LLP; Vazken Alexanian

(57) ABSTRACT

Apparatus and method for generating an optimal set of choices. The apparatus includes: a generating section operable to generate a new set of choices to be shown to a chooser, wherein the new set of choices includes at least two selectable subjects among a plurality of selectable subjects; and an output section operable to output the new set of choices generated by the generating section. There is also provided a method and a computer program product.

15 Claims, 5 Drawing Sheets

(56) References Cited

U.S. PATENT DOCUMENTS

| | | | |
|---|---|---|---|
| 10,009,377 B2* | 6/2018 | Kamijoh | G06Q 50/01 |
| 10,122,811 B2* | 11/2018 | Kawanaka | H04L 67/306 |
| 10,129,350 B2* | 11/2018 | Kawanaka | H04L 67/306 |
| 2008/0133320 A1 | 6/2008 | Gluhovsky et al. | |

OTHER PUBLICATIONS

C. E. Rasmussen & C. K. I. Williams, Gaussian Processes for Machine Learning, the MIT Press, 2006, Chapter 5 Model Selection and Adaptation of Hyperparameters, pp. 1-24.*

+(Generating choices and initial choices and initial feature vector and standard vector and difference and Bayesian optimization and Gaussian, Bobak Shahriari, Kevin Swersky, Ziyu Wang, Ryan P. Adams and Nando de Freitas, pp. 1-25.*

Practical Bayesian Optimization of Machine Learning Algorithms, Jasper Snoek, Hugo Larochelle, Ryan P. Adams, pp. 1-9, 2012.*

* cited by examiner

APPARATUS AND METHOD FOR GENERATING AN OPTIMAL SET OF CHOICES

TECHNICAL FIELD

The present invention relates to generating an optimal set of choices. More specifically, an apparatus and method for generating an optimal set of choices for a user.

BACKGROUND OF THE INVENTION

Characteristics of choosers (e.g., customers or users of items) can be estimated by analyzing the choice that is chosen from a set of choices by the choosers. Some information about the chooser such as a distribution of a preference vector of the chooser can be obtained from the choices of the choosers by analyzing the set of choices and the choice chosen therefrom by the chooser. The quality of the set of choices can be evaluated based on the amount of information about the characteristics obtained from the choice made by the choosers. For example, if all choices are identical, the selection from the set of choices gives no information about the characteristics of the target. Therefore, in order for more information about the characteristics of the chooser to be obtained from the choice, the set of choices needs to be properly designed.

Since the quality of a set of choices is often a black box function, it has been difficult to analytically evaluate the set of choices. In many cases, the quality of a set of choices is evaluated by a time-consuming Monte Carlo simulation. Therefore, it takes a large amount of time to find a good set of choices.

SUMMARY OF THE INVENTION

The present invention provides an apparatus that includes: a generating section that generates a new set of choices to be shown to a chooser, wherein the new set of choices includes at least two selectable subjects among a plurality of selectable subjects; and an output section that outputs the new set of choices generated by the generating section.

The present invention also provides a computer program product for generating an optimal set of choices including a computer readable storage medium having program instructions embodied therewith, the program instructions executable by a computer to cause the computer to perform operations including the steps of: generating a new set of choices to be shown to a chooser, wherein the new set of choices includes at least two selectable subjects among a plurality of selectable subjects; and outputting the new set of choices generated by the generating section.

The present invention further provides a computer-implemented method for generating an optimal set of choices, including: generating a new set of choices to be shown to a chooser, wherein the new set of choices includes at least two selectable subjects among a plurality of selectable subjects; and outputting the new set of choices generated by the generating section.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION OF PREFERRED EMBODIMENTS

Hereinafter, example embodiments of the present invention will be described. These example embodiments shall not limit the claims, and not all of the features described in the embodiments are necessarily essential to the invention.

Figure 1:
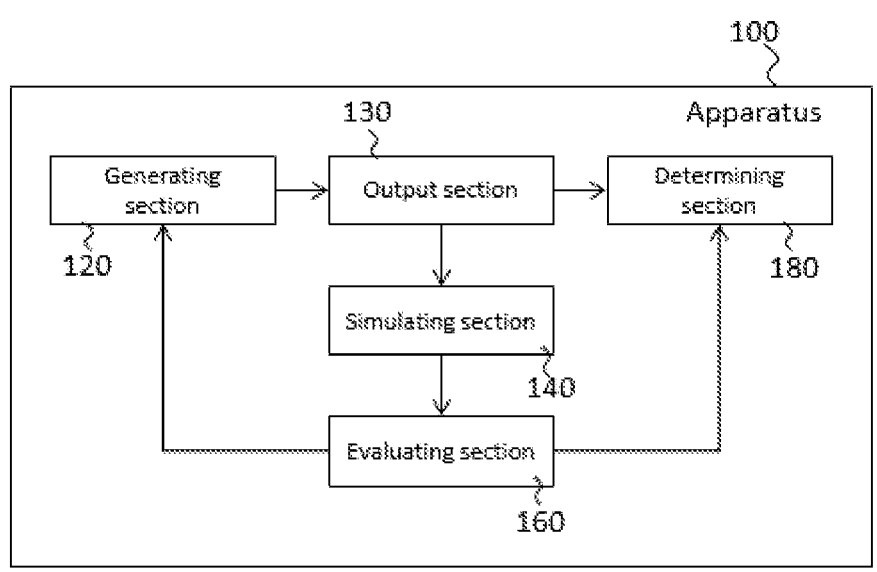
FIG. 1 shows an exemplary configuration of the apparatus 100, according to an embodiment of the present invention.

FIG. 1 shows a block diagram of apparatus 100, according to an embodiment of the invention. Apparatus 100 can find a good set of choices in a shorter time than current systems by utilizing a relative feature vector, which can be used in an improved framework of Bayesian Optimization. Apparatus 100 includes generating section 120, output section 130, simulating section 140, evaluating section 160, and determining section 180.

Generating section 120 can be operable to generate a new set of choices to be shown to a chooser. The new set of choices includes at least two selectable subjects among a plurality of selectable subjects. Generating section 120 can generate the new set of choices based on evaluations of sample sets of choices and a similarity between two sample sets of choices by utilizing Bayesian Optimization. At least a part or all of the sample sets of choices can be sets of choices previously generated as the new sets of samples by generating section 120.

Generating section 120 can calculate the similarity between two sample sets of choices by using a relative feature vector of each choice included in each sample set of choices. Generating section 120 can calculate a similarity between two sample sets of choices with a kernel function. The relative feature vector represents a difference between a standard vector and a feature vector in the set. The details of the generation of the new set of choices are explained below. Generating section 120 can provide output section 130 with the new set of choices.

Output section 130 can be operable to output the new set of choices generated by generating section 120. Output section 130 can provide the simulating section 140 and determining section 180 with the output new set of choices.

Simulating section 140 can be operable to simulate a choice of the chooser in response to providing the new set of choices to the chooser. Simulating section 140 can provide evaluating section 160 with the result of the simulation.

Evaluating section 160 can be operable to evaluate the new set of choices based on the estimated preference vector of the chooser. Evaluating section 160 can estimate a preference vector of the chooser based on the simulated choice of the chooser generated by simulating section 140. For example, evaluating section 160 can generate a posterior distribution of the preference vector of the chooser.

Then, evaluating section 160 can evaluate the new set of choices based on the differential entropy of the posterior distribution of the preference vector of the chooser. Evaluating section 160 can provide generating section 120 and determining section 180 with the evaluation of the new set of choices such as the differential entropy of the posterior distribution of the preference vector obtained by the new set of choices.

Determining section 180 can be operable to determine one or more optimal sets of choices from a plurality of new sets of choices generated by generating section 120, based on the evaluations of the plurality of new sets of choices. Determining section 180 can provide a user of apparatus 100 with the determined optimal set of choices, for example, by displaying the determined optimal set on a screen of apparatus 100.

Each of generating section 120, output section 130, simulating section 140, evaluating section 160, and determining section 180 can be a circuit, a shared or dedicated computer readable medium storing computer readable program instructions executable by a shared or dedicated processor, etc.

As explained above, generating section 120 generates the new set of choices based on the similarity between two sample sets of choices by using the relative feature vector of each choice. The choice behavior of a human is influenced in a larger degree by relative differences among choices in a choice set than by absolute values of choices. Therefore, apparatus 100 accurately models the choice behavior of a human, and thus can reduce the number of generations of new sets of choices for obtaining the optimal set of choices.

In some embodiments, a storage section can further be implemented for storing information necessary for each element of apparatus 100. The storage section can be implemented within a housing of apparatus 100, while in other embodiments the storage section can be outside the housing of apparatus 100, such as across a communication network from the apparatus.

Figure 2:
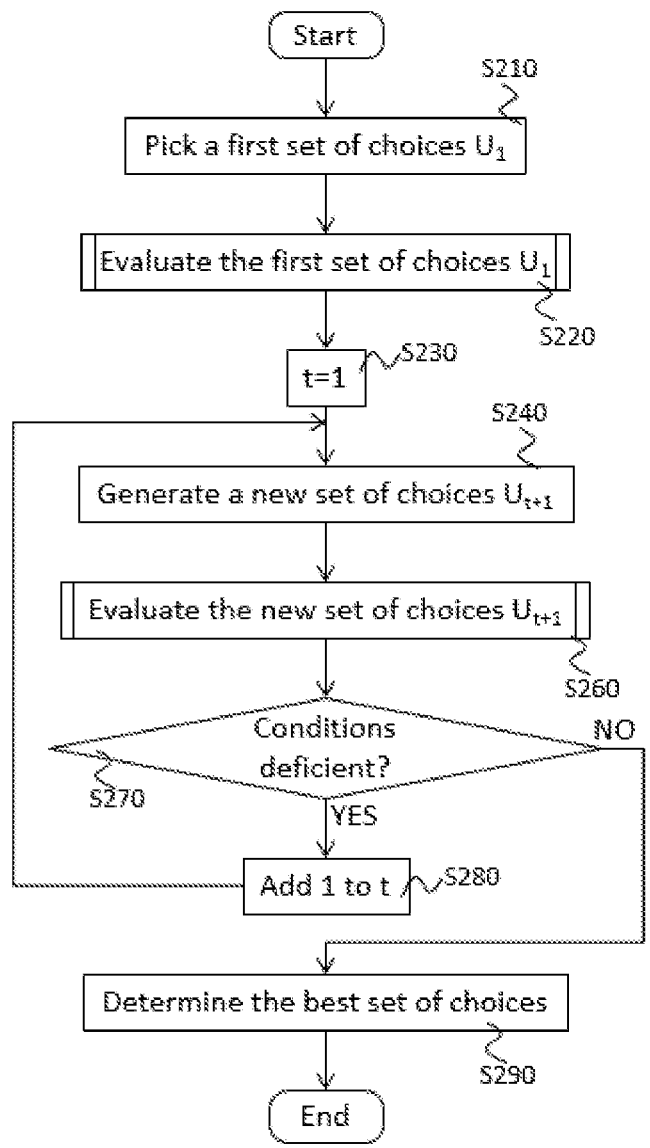
FIG. 2 shows an operational flow of an exemplary configuration of an apparatus, according to an embodiment of the present invention.

FIG. 2 shows an operational flow of an exemplary configuration of an apparatus, according to an embodiment of the present invention. The present embodiment describes an example in which an apparatus, such as apparatus 100, performs the operations from S210 to S290, as shown in FIG. 2. FIG. 2 shows one example of the operational flow of the apparatus 100 shown in FIG. 1, but apparatus 100 shown in FIG. 1 is not limited to using this operational flow. Also, the operational flow in FIG. 2 can be performed by other embodiments of an apparatus.

First, at S210, a generating section, such as generating section 120, can pick a first set of choices $U_1$. The first set of choices can include at least two selectable subjects as "choices." Each choice is represented by a feature vector of a subject. The feature vector represents characteristics of each choice in the first set of choices. For example, if choices are items sold in on or off-line stores, then the feature vectors of the choices include values representing characteristics of the items such as price, size, color, function, and etc. The generating section can generate a matrix for the first set of choices $U_1$, which can include feature vectors of items.

The generating section can generate an arbitrary set of choices as the first set of choices $U_1$. In one embodiment, the generating section can generate the first set by randomly choosing subjects among a plurality of selectable subjects and can combine feature vectors of chosen subjects to generate a matrix included of the feature vectors. The generating section then provides an output section, such as the output section 130, with the first set of choices $U_1$ and the matrix of the first set of choices $U_1$ (a set of choices and a matrix thereof are hereinafter referred to as "set of choices"). Output section 130 can provide a simulating section, such as simulating section 140, and a determining section, such as determining section 180, with the first set of choices $U_1$.

Next, at S220, a simulating section, such as simulating section 140, can perform a simulation, and an evaluating section, such as evaluating section 160, can evaluate the first set of choices $U_1$ based on a result of the simulation. The details of S220 are explained below in relation to FIG. 5. The evaluating section can provide the evaluation $y_1$ of the first set of choices $U_1$ with the generating section and the determining section. The determining section can then store a pair $\{(U_1, y_1)\}$ as a history of an observation.

Next, at S230, the generating section can set a variable "t" equal to 1, which represents the number of sets of choices generated by the generating section.

Next, at S240, the generating section can generate a new set of choices $U_{t+1}$, based on Bayesian Optimization, which utilizes evaluation $(y_1, y_2, \ldots y_t)$ of past sets (i.e., already generated sets) of choices $(U_1, U_2, \ldots, U_t)$ and a similarity between all pairs of the past sets of choices $(U_1, U_2, \ldots, U_t)$. The generating section can generate the new set of choices $U_{t+1}$ in which the matrix maximizes the expected improvement of a Gaussian process. For example, the generating section can generate the new set by using the following formula (1).

$$U_{t+1} = \mathrm{argmax}_U (\mu(U) - y^+)\Phi(z) + \sigma(U)\phi(z) \qquad \text{formula (1)}$$

where $$y^+ \equiv \max\{y_1, \ldots, y_t\}$$

$$z \equiv \frac{\mu(U) - y^+}{\sigma(U)}$$

$$\mu(U) \equiv k^T K^{-1} f_{1:t}$$

$$\sigma^2(U) \equiv k(U, U) - k^T K^{-1} k$$

$$k \equiv (k(U, U_1), \ldots, k(U, U_t))^T$$

$$f_{1:t} \equiv (y_1, \ldots, y_t)^T$$

$$K \equiv \begin{pmatrix} k(U_1, U_1) & \cdots & k(U_1, U_t) \\ \vdots & \ddots & \vdots \\ k(U_t, U_1) & \cdots & k(U_t, U_t) \end{pmatrix} + \sigma_{noise}^2 I$$

Here, $k(\bullet, \bullet)$ is a kernel function, which determines a similarity between a pair of matrices. For example, $k(U_x, U_y)$ outputs a similarity between matrices of a set of choices $U_x$ and a set of choices $U_y$, where $U_x$ includes feature vectors of choices $(u_{x1}, u_{x2}, \ldots, u_{xn})$ and $U_y$ includes feature vectors of choices $(u_{y1}, u_{y2}, \ldots, u_{yn})$.

Figure 3:
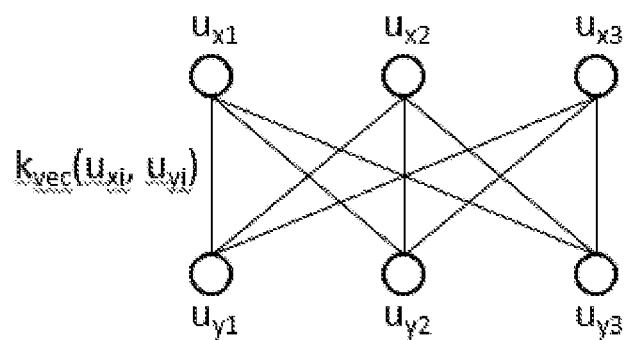
FIG. 3 shows a bipartite graph of the set U and the set V, according to an embodiment of the present invention.

FIG. 3 shows a bipartite graph of choices in the set $U_x$ and the set $U_y$. One part of the graph corresponds to nodes of the feature vectors $(u_{x1}, u_{x2}, u_{x3})$ in the set $U_x$ and the other part of the graph corresponds to nodes of the feature vectors $(u_{y1}, u_{y2}, u_{y3})$ in the set $U_y$. The weight between nodes $u_{xi}$ and $u_{yj}$ is $k_{vec}(u_{xi}, u_{yj})$, which represent a similarity between the vectors $u_{xi}$ and $u_{yj}$. $k_{vec}(u_{xi}, u_{yj})$ is the squared exponential kernel, which is calculated by: $k_{vec}(u_{xi}, u_{yj}) = \exp(-\|u_{xi} - u_{yj}\|^2)$. The generating section can obtain an output value of $k(U_x, U_y)$ by computing the maximum weighted matching of the graph, e.g. by calculating: $k(U_x, U_y)=\max_\sigma \Sigma_i k_{vec}(u_{xi}, u_{y\sigma}(i))$, where $\sigma$ is a permutation function.

Figure 4:
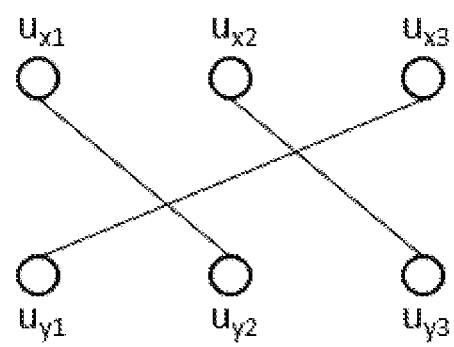
FIG. 4 shows the bipartite graph after pairing, according to an embodiment of the present invention.

FIG. 4 shows the bipartite graph after the maximization. In the example of FIG. 4, the node $u_{x1}$ is coupled with the node $u_{y2}$, the node $u_{x2}$ is coupled with the node $u_{y3}$, and the node $u_{x3}$ is coupled with the node $u_{y1}$, as the generating section calculates $k(U_x, U_y)$. Thus, in this example, $k(U_x, U_y)$ is the sum of $k_{vec}(u_{x1}, u_{y2})$, $k_{vec}(u_{x2}, u_{y3})$, and $k_{vec}(u_{x3}, u_{y1})$.

Here, the generating section inputs relativized matrices $U'_x$, $U'_y$ of sets of choices into the kernel function $k(U'_x, U'_y)$, instead of the original matrices $U_x$, $U_y$ of the sets of choices in calculating the formula (1). The relativized matrices $U'_x$, $U'_y$ include relative feature vectors of choices, while the matrices $U_x$, $U_y$ of original sets include absolute feature vectors.

The generating section generates the relativized matrix of the new set of choices from the original matrix of the set of choices. In one embodiment, the generating section generates the relative feature vectors $(u'_{x1}, u'_{x2}, \ldots, u'_{xn})$ of the relativized matrix $U'_x$ from differences between standard vectors $u_0$ and original feature vectors $(u_{x1}, u_{x2}, \ldots, u_{xn})$ of the original set of choices $U_x$. The original feature vectors can be considered to be the absolute feature vectors. The generating section can calculate the relative vector $u'_{xi}$ by $u'_{xi}=u_{xi}-u_{x0}$.

In some embodiments, the generating section can use an average vector of the feature vectors in the set as the standard vector. In these embodiments, the generating section can obtain the standard vector $u_{x0}$ for $U_x$ by: $u_0=(u_{x1}+u_{x2}+\ldots+u_{xn})/n$. The generating section generates the relative feature vectors $(u'_{y1}, u'_{y2}, \ldots, u'_{ym})$ of the relativized matrix $U'_y$ from the original matrix $U_y$ in the same manner.

In other embodiments, the generating section can use a vector closest to an average vector of the feature vectors among the feature vectors in the set as the standard vector. In these embodiments, the generating section can obtain the standard vector $u_0$ for $U$ by: $u_0=\text{argmin }\{\|u_i-(u_1+u_2+\ldots+u_n)/n\| | u_i \text{ in } U\}$. The generating section generates the relative feature vectors $(u'_{y1}, u'_{y2}, \ldots, u'_{ym})$ of the relativized matrix $U'_y$ from the original matrix $U_y$ in the same manner.

In further embodiments, the generating section can find the new set of choices $U_{t+1}$ satisfying the formula (1) by randomly generating a given number of sample sets of choices and then choosing the best set from the given number of the sample sets based on the formula (1). In further embodiments, the generating section can find the new set of choices $U_{t+1}$ by a hill climbing method. By utilizing formula (1), the generating section can generate the new set of choices $U_{t+1}$ based on a magnitude of the estimated evaluation of the new set of choices $U_{t+1}$ and an uncertainty of the estimated evaluation of the new set of choices $U_{t+1}$.

If the maximum weighted matching explained in relation to FIGS. 3-4 is computationally prohibitive, then the generating section can use approximate methods such as a pyramid match kernel.

Next at S260, the simulating section can perform the simulation and the evaluating section can evaluate the new set of choices $U_{t+1}$ based on the result of the simulation. The details of S260 are explained in relation to FIG. 5. The evaluating section can provide the evaluation $y_{t+1}$ of the new set of choices $U_{t+1}$ with the generating section and the determining section. The determining section can then add and store a pair $\{(U_{t+1}, y_{t+1})\}$ as the history of the observation.

Next, at S270, the generating section can determine whether termination condition(s) are deficient. The termination condition can be that a given number of iterations of a loop of S240-S280 is completed, that a given time has passed, and/or the latest evaluation $y_{t+1}$ of the latest set of choices $U_{t+1}$ exceeds a given threshold. If the decision is positive, then the generating section can proceed with S280, and if negative, then the generating section can proceed with S290.

At S280, the generating section can add 1 to t to generate another new set of choices at S240 of the next iteration. The generating section can then go back to S240.

At S290, the determining section can determine one or more optimal sets of choices from a plurality of the new sets of choices generated by the generating section, based on the history of the observation $\{(U_1, y_1), (U_2, y_2), \ldots, (U_t, y_t)\}$. In one embodiment, the determining section can determine one optimal set of choices $U_B$ that has the best evaluation $y_B$ among the plurality of the sets of choices $(U_1, U_2, \ldots, U_t)$.

As described above, the generating section generates new sets of choices based on relative feature vectors of choices in the past set(s) of choices. Since the relative feature vector is more suitable to a choice behavior of a human than the absolute feature vector, the generating section improves the evaluation of the new set of choices faster than cases where the original (absolute) feature vector is used. Therefore, the apparatus can find a sufficiently good set of choices with a smaller number of generations and evaluations of sample sets of choices, thereby reducing time and computational resource needed for finding a good set of choices, or finding better choice sets in a given time.

Figure 5:
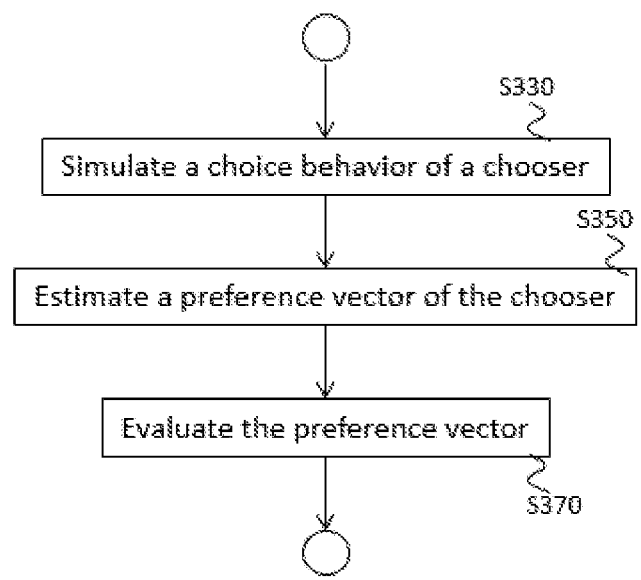
FIG. 5 shows an operational flow of evaluation process in FIG. 2, according to an embodiment of the present invention.

FIG. 5 shows an operational flow of evaluation process, according to an embodiment of the present invention. The generating section can perform an evaluation, such as the evaluation performed at S220 and S260 in FIG. 2, according to the flowchart of FIG. 5. The present embodiment describes an example in which an apparatus, such as apparatus 100, performs the characteristic estimation by the operations from S330 to S370 shown in FIG. 5.

First, at S330, the simulating section can simulate a choice behavior of a chooser where the set of choices $U_1$ or $U_{t+1}$ is given to the chooser. The chooser can be an actual human or a virtual chooser. The simulating section can simulate the choice behavior of one or more choosers. The chooser is given a preference vector w, which represents preferences of the chooser about the choice behavior, and which has the same dimension as the feature vector of choices. The simulating section can simulate the choice behavior of the chooser based on the multinomial log it model. In one embodiment, in the model, a probability that the $i^{th}$ choice (e.g., an $i^{th}$ item) in the set of choices is chosen can be represented by the following Pr(i): $\text{Pr}(i) \sim \exp(u_i \cdot w)$. In another embodiment, a human plays the role of the simulating section and performs the choice from the set of choices. The simulating section can provide the evaluating section with the result of the simulation (e.g., the set of choices given to the chooser(s), and, the choice(s) chosen by the chooser(s)).

Next, at S350, the evaluating section can estimate the preference vector of the chooser based on the result of the simulation at S330. The evaluating section estimates the preference vector without the knowledge of the preference vector previously given to the simulating section at S330. The evaluating section can estimate the preference vector in an assumption that the preference vector of the chooser has a Gaussian prior distribution. In one embodiment, the evaluating section can generate a posterior distribution of the estimated preference vector of the chooser(s) based on the result of the simulation, as an observation, and the assumed prior distribution.

Next, at S370, the evaluating section can evaluate the preference vector estimated at S350. The evaluating section can calculate differential entropy of the posterior distribution generated at S350 as an evaluation of the preference vector. In one embodiment, the evaluating section can use an inverse of the differential entropy as the evaluation of the set of choices. The differential entropy generally represents an amount of information obtained from the posterior distribution of the preference vector. For example, if the differential entropy of a preference vector that is estimated from a simulation of a set of choices is low, then the set of choices can obtain much information from a chooser, and the set is considered to be good set.

While in the embodiment of FIG. 5, the simulating section simulates one choice from a set of choices by chooser(s), the simulating section can simulate a plurality of choices from a plurality of sets of choices by the chooser(s) in other embodiments. In these embodiments, the simulating section can simulate the chooser(s) making choices in sequence, and the future choice can depend on the preceding choice(s) of the chooser(s), where the first set of choices in the sequence is the new set of choices $U_{t+1}$ (or the first set of choices $U_1$). For example, an action of a partially observable Markov decision process is a set of choices, and the simulating section can determine the optimal action that maximizes the value function (e.g., differential entropy obtained from a choice from the set of choices) at a given state. Thereby, the simulating section determines sequential actions (sequential sets of choices given to the chooser(s)). The evaluating section can estimate the posterior distribution of the preference vector from choices from those sequential sets of choices, and calculate the differential entropy of the posterior distribution as the evaluation of the sets of choices.

Figure 6:
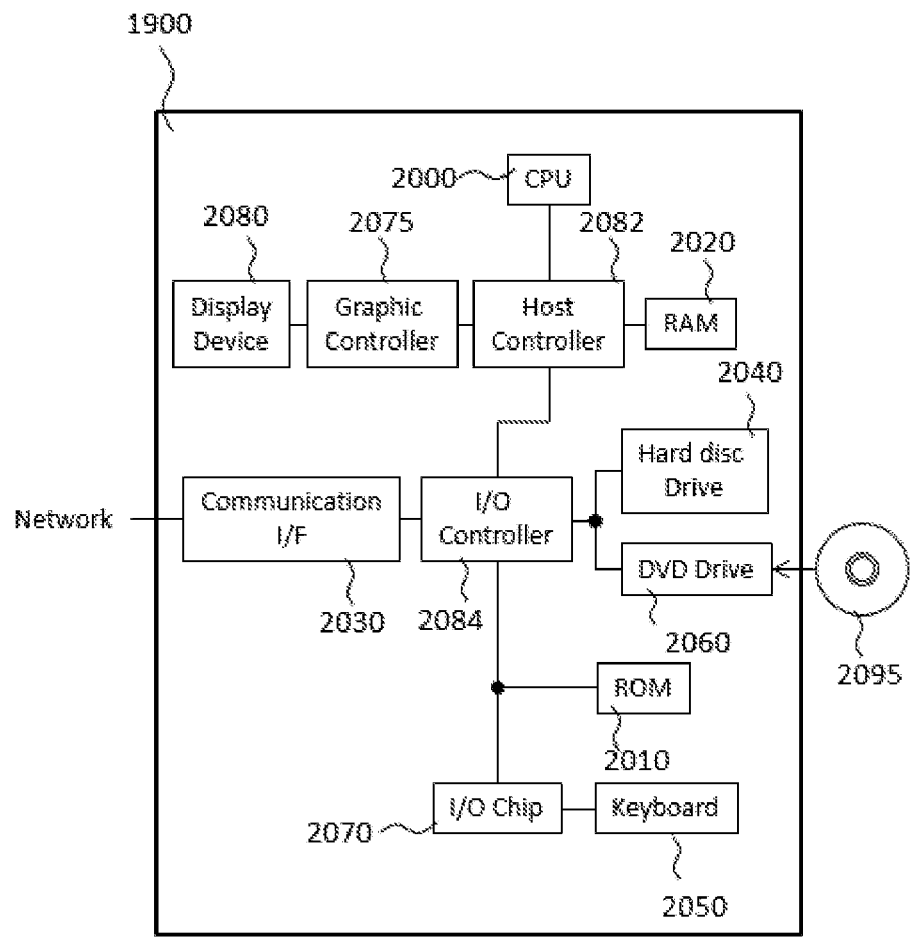
FIG. 6 shows a computer, according to an embodiment of the present invention.

FIG. 6 shows an exemplary configuration of computer 1900 according to an embodiment of the invention. Computer 1900 according to the present embodiment includes CPU 2000, RAM 2020, graphics controller 2075, and display apparatus 2080, which are mutually connected by host controller 2082. Computer 1900 also includes input/output units such as communication interface 2030, hard disk drive 2040, and DVD-ROM drive 2060, which are connected to host controller 2082 via input/output controller 2084. The computer also includes legacy input/output units such as ROM 2010 and keyboard 2050, which are connected to input/output controller 2084 through input/output chip 2070.

Host controller 2082 connects RAM 2020 with CPU 2000 and graphics controller 2075, which access RAM 2020 at a high transfer rate. CPU 2000 operates according to programs stored in ROM 2010 and RAM 2020, thereby controlling each unit. Graphics controller 2075 obtains image data generated by CPU 2000 on a frame buffer or the like provided in RAM 2020, and causes the image data to be displayed on display apparatus 2080. Alternatively, graphics controller 2075 can contain therein a frame buffer or the like for storing image data generated by CPU 2000.

Input/output controller 2084 connects host controller 2082 with communication interface 2030, hard disk drive 2040, and DVD-ROM drive 2060, which are relatively high-speed input/output units. Communication interface 2030 communicates with other electronic devices via a network. Hard disk drive 2040 stores programs and data used by CPU 2000 within computer 1900. DVD-ROM drive 2060 reads the programs or the data from DVD-ROM 2095, and provides hard disk drive 2040 with the programs or the data via RAM 2020.

ROM 2010 and keyboard 2050 and input/output chip 2070, which are relatively low-speed input/output units, are connected to input/output controller 2084. ROM 2010 stores therein a boot program or the like executed by computer 1900 at the time of activation, a program depending on the hardware of computer 1900. Keyboard 2050 inputs text data or commands from a user, and can provide hard disk drive 2040 with the text data or the commands via RAM 2020. Input/output chip 2070 connects keyboard 2050 to input/output controller 2084, and can connect various input/output units via a parallel port, a serial port, a keyboard port, a mouse port, and the like to input/output controller 2084.

A program to be stored on hard disk drive 2040 via RAM 2020 is provided by a recording medium as DVD-ROM 2095, and an IC card. The program is read from the recording medium, installed into hard disk drive 2040 within the computer 1900 via RAM 2020, and executed in CPU 2000.

A program that is installed in computer 1900 can cause computer 1900 to function as an apparatus, such as apparatus 100 of FIG. 1. The program or module acts on CPU 2000, to cause computer 1900 to function as a section, component, element such as each element of apparatus 100 of FIG. 1 (e.g., generating section 120, output section 130, simulating section 140, evaluating 160, determining section 180 and etc.).

The information processing described in these programs is read into computer 1900, to function as the determining section, which is the result of cooperation between the program or module and the above-mentioned various types of hardware resources. Moreover, the apparatus is constituted by realizing the operation or processing of information in accordance with the usage of computer 1900.

For example, in response to communication between computer 1900 and an external device, CPU 2000 can execute a communication program loaded onto RAM 2020, to instruct communication processing to communication interface 2030, based on the processing described in the communication program.

Communication interface 2030, under control of CPU 2000, reads the transmission data stored on the transmission buffering region provided in the recording medium, such as RAM 2020, hard disk drive 2040, or DVD-ROM 2095, and transmits the read transmission data to a network, or writes reception data received from a network to a reception buffering region or the like provided on the recording medium. In this way, communication interface 2030 can exchange transmission/reception data with the recording medium by a DMA (direct memory access) method, or by a configuration that CPU 2000 reads the data from the recording medium or communication interface 2030 of a transfer destination, to write the data into communication interface 2030 or the recording medium of the transfer destination, so as to transfer the transmission/reception data.

In addition, CPU 2000 can cause all or a necessary portion of the file of the database to be read into RAM 2020 such as by DMA transfer, the file or the database having been stored in an external recording medium such as hard disk drive 2040, DVD-ROM drive 2060 (DVD-ROM 2095) to perform various types of processing onto the data on RAM 2020. CPU 2000 can then write back the processed data to the external recording medium by means of a DMA transfer method or the like. In such processing, RAM 2020 can be considered to temporarily store the contents of the external recording medium, and so RAM 2020, the external recording apparatus, and the like are collectively referred to as a memory, a storage section, a recording medium, a computer readable medium, etc.

Various types of information, such as various types of programs, data, tables, and databases, can be stored in the recording apparatus, to undergo information processing. Note that CPU 2000 can also use a part of RAM 2020 to perform reading/writing thereto on the cache memory. In such an embodiment, the cache is considered to be contained in RAM 2020, the memory, and/or the recording medium unless noted otherwise, since the cache memory performs part of the function of RAM 2020.

CPU 2000 can perform various types of processing, onto the data read from RAM 2020, which includes various types of operations, processing of information, condition judging, search/replace of information, etc., as described in the present embodiment and designated by an instruction sequence of programs, and writes the result back to RAM 2020. For example, if performing condition judging, then CPU 2000 can judge whether each type of variable shown in the present embodiment is larger, smaller, no smaller than, no greater than, or equal to the other variable or constant, and if the condition judging results in the affirmative (or in the negative), then the process branches to a different instruction sequence, or calls a sub routine.

In addition, CPU 2000 can search for information in a file, a database, etc., in the recording medium. For example, if a plurality of entries, each having an attribute value of a first attribute is associated with an attribute value of a second attribute, are stored in a recording apparatus, then CPU 2000 can search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module can be stored in an external recording medium. Exemplary recording mediums include DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to computer 1900 via the network.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium, which can implement the storage section, can be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server.

In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s).

In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize the apparatus for the optimization of predictor variables.

What is claimed is:

1. An apparatus for generating an optimal set of choices, the apparatus comprising:
a generating section that generates a new set of choices with a processor device configured to generate choices, the generating section configured to:
determine an initial set of choices;
determine, for each choice of the initial set of choices, an initial feature vector representing one or more characteristics of the choice;
determine a standard vector based on the initial feature vectors;
determine, for each initial feature vector, a relative feature vector representing a difference between the standard vector and the initial feature vector; and
determine the new set of choices based on a Bayesian Optimization on the initial set of choices and the relative feature vectors, the new set of choices selected to maximize an expected improvement of a Gaussian process according to the formula:

$$U_{t+1} = \mathrm{argmax}_U(\mu(U) - y^+)\Phi(z) + \sigma(U)\phi(z); \text{ and}$$

an output section operable to output the new set of choices generated by the generating section to a screen for selection by a user;
wherein the new set of choices includes at least two selectable subjects among a plurality of selectable subjects.

2. The apparatus of claim 1, wherein the generating section calculates a similarity between two sample sets of choices by using a relative feature vector of each choice included in each sample set of choices.

3. The apparatus of claim 2, further comprising an evaluating section to evaluate the new set of choices, wherein the generating section generates the new set of choices based on an evaluation of each sample set of choices.

4. The apparatus of claim 1, further comprising a simulating section that simulates a choice of the chooser in response to providing the new set of choices to the chooser.

5. The apparatus of claim 3, wherein the evaluating section further comprises:
estimating a preference vector of the chooser based on the simulated choice of the chooser; and
evaluating the new set of choices based on the estimated preference vector of the chooser.

6. The apparatus of claim 3, wherein the evaluating section generates a posterior distribution of the preference vector, and evaluates the new set of choices based on a differential entropy of the posterior distribution of the preference vector.

7. The apparatus of claim 5, wherein the generating section generates the new set of choices based on a magnitude of the estimated evaluation of the new set of choices and an uncertainty of the estimated evaluation of the new set of choices.

8. The apparatus of claim 1, further comprising a determining section to determine one optimal set of choices from a plurality of new sets of choices generated by the generating section.

9. The apparatus of claim 1, wherein the generating section calculates a similarity between the two sample sets of choices with a kernel function.

10. The apparatus of claim 6, wherein the standard vector is an average vector of the initial feature vectors.

11. The apparatus of claim 6, wherein the standard vector is a vector closest to an average vector of the initial feature vectors.

12. A computer program product for generating an optimal set of choices including a non-transitory computer readable storage medium having program instructions embodied therewith, the program instructions executable by a computer to cause the computer to perform operations comprising the steps of:
   generating a new set of choices with a processor device configured to generate choices;
   determining an initial set of choices;
   determining, for each choice of the initial set of choices, an initial feature vector representing one or more characteristics of the choice;
   determining a standard vector based on the initial feature vectors;
   determining, for each initial feature vector, a relative feature vector representing a difference between the standard vector and the initial feature vector;
   determining the new set of choices based on a Bayesian Optimization on the initial set of choices and the relative feature vectors, the new set of choices selected to maximize an expected improvement of a Gaussian process according to the formula:

$$U_{t+1}=\mathrm{argmax}_U(\mu(U)-y^+)\Phi(z)+\sigma(U)\phi(z);\text{ and}$$

outputting the new set of choices generated by the generating section to a screen for selection by a user;
   wherein the new set of choices includes at least two selectable subjects among a plurality of selectable subjects.

13. The computer program product of claim 12, wherein the generating step further comprises calculating a similarity between two sample sets of choices by using a relative feature vector of each choice included in each sample set of choices.

14. A computer-implemented method for generating an optimal set of choices, the method comprising:
   generating a new set of choices with a processor device configured to generate choices;
   determining an initial set of choices;
   determining, for each choice of the initial set of choices, an initial feature vector representing one or more characteristics of the choice;
   determining a standard vector based on the initial feature vectors;
   determining, for each initial feature vector, a relative feature vector representing a difference between the standard vector and the initial feature vector;
   determining the new set of choices based on a Bayesian Optimization on the initial set of choices and the relative feature vectors, the new set of choices selected to maximize an expected improvement of a Gaussian process according to the formula:

$$U_{t+1}=\mathrm{argmax}_U(\mu(U)-y^+)\Phi(z)+\sigma(U)\phi(z);\text{ and}$$

outputting the new set of choices generated by the generating section to a screen for selection by a user;
   wherein the new set of choices includes at least two selectable subjects among a plurality of selectable subjects.

15. The method of claim 14, wherein the generating step further comprises calculating a similarity between two sample sets of choices by using a relative feature vector of each choice included in each sample set of choices.

* * * * *